United States Patent Office 3,297,604
Patented Jan. 10, 1967

3,297,604
OXIDIZED GALACTOSE CONTAINING
REACTION PRODUCTS
Felix J. Germino, Yorktown Heights, N.Y., assignor to
American Machine & Foundry Company, a corporation
of New Jersey
No Drawing. Filed Oct. 28, 1963, Ser. No. 319,587
15 Claims. (Cl. 260—17.4)

This invention relates to polymer compositions and more particularly to galactose containing polymers and other carbohydrates possessing the galactose configuration at the $C_4$ position, which are oxidized at the $C_6$ position to produce a galacto hexoaldose.

The invention further relates to polymer compositions produced when aldehyde-containing polymers of this kind are used in effecting cross-linking of various organic compounds.

In accordance with the invention, galactose polymers or carbohydrates containing the galactose configuration at the $C_4$ position, upon oxidation, either enzymatically or chemically, result in products having an active carbonyl group at the $C_6$ position and as such are highly useful as intermediates in various reactions. These intermediates may be used for example in cross-linking polysaccharides, natural or synthetic, water-soluble gums, paper, tobacco, amino hydroxy type compounds, e.g. chitin and the like. Additionally, the oxidized intermediate can enter into typical reactions as do other carbonyl compounds or alternately these intermediates can be further oxidized to form useful products.

It is an object of the present invention to provide novel compositions resulting from the oxidation of galactose containing carbohydrates or carbohydrates containing the galactose configuration at the $C_4$ position.

It is a more specific object of the invention to provide novel compositions, and the method for the preparation thereof, of galactose containing carbohydrates or carbohydrates containing the galactose configuration at the $C_4$ position oxidized in the presence of the enzyme galactose oxidase.

It is another object of the invention to provide cross-linked polymeric reaction products employing an oxidized galactose containing compound as the cross-linking agent.

Additional objects and advantages of the invention will become apparent as a more detailed description of the invention is presented hereinbelow.

As contemplated by the invention, certain highly useful intermediates can be prepared by chemical or enzymatic oxidation of carbohydrate compounds which are characterized by either a structure which has the galactose unit or a structure which contains the galactose configuration at the $C_4$ position.

Illustrative of a compound which contains the galactose unit is d-galactose which upon oxidation produces d-galactose hexoaldose as follows:

(I)

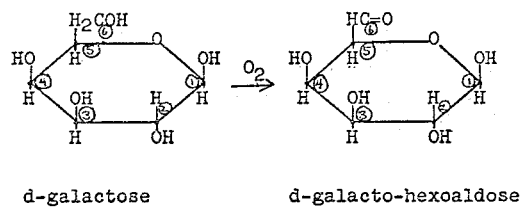

d-galactose      d-galacto-hexoaldose

Illustrative of a galactose containing compound of polymeric structure is guar shown below following the oxidation thereof at the $C_6$ position of the galactose unit.

(II)

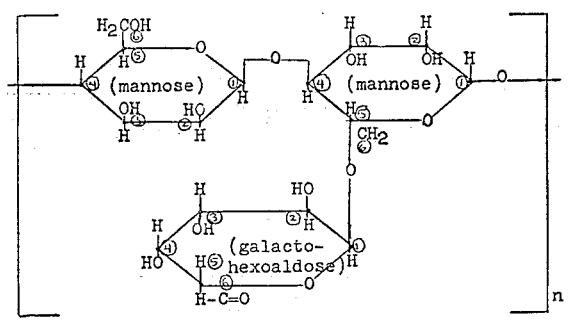

Illustrative of a compound which contains the galactose configuration at the $C_4$ position is d-talose shown in an oxidation reaction to d-talo-hexoaldose.

(III)

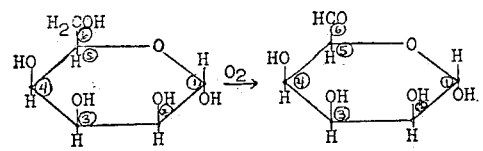

Illustrative additional galactose containing compounds or compounds having the galactose configuration which may be oxidized in accordance with the invention are, for example, locust bean gum, D-gulose, gum arabic, agar, arabogalactan, tamarind, karaya gum, ghatti gum and the like.

The oxidized porduct contains an aldehyde group at the $C_6$ position and as such are valuable intermediates which can enter into many of the typical carbonyl reactions. Illustrative of such reactions are for example formation of cyano hydrins, bisulfite addition compounds, oximes, hydrazones, etc. Intermediates so prepared, i.e. in which oxidation has been effected at the $C_6$ position, have been found also to be useful in cross-linking the broad range of polymers, both natural and synthetic, e.g. polyamino polymers, polyhydroxy polymers and proteins, and including for example water soluble gums, cellulose, paper, hydroxyl and amino compounds and the like. Illustrative of specific compounds which these intermediates may effectively cross-link are polyethylenimine, cellulosic derivatives, e.g. methylcellulose, ethylcellulose, carboxymethyl cellulose, methylethyl cellulose, hydroxy propyl methyl cellulose, etc., hydroxyethylcellulose, hydroxy ethyl carboxymethyl cellulose, galacetomannans, such as guar, locust bean gum etc.; polyvinyl alcohols; chitin; starches, e.g. normal and hybrid and derivatives thereof, e.g. hydroxy propyl starch, starch acetate, etc.; amylose and derivatives thereof; tobacco sheet; paper; polyuronides such as pectins, algins, etc.; carageenans; karaya; tragacanth and various derivatives of these compounds.

In addition to its function as a highly effective cross-linking agent, the intermediates of the invention may usefully be employed in various film-forming applications, e.g. as an adhesive or binding agent in self-sustaining films. As such, for example, the oxidation reaction product of polymeric of galactomannan may be used in the manufacture of paper or tobacco sheet. Additionally, for example, the oxidized galactose containing carbohydrates or carbohydrates having the galactose configuration at $C_4$ position can be further oxidized with periodic acid to produce a compound yielding two or more carbonyls at the $C_2$ and $C_3$ positions. This treatment may also be used to vary the ratio of carbonyls at the $C_2$, $C_3$ and $C_6$ positions. The product formed can enter into many reactions typical of carbonyls. The further oxidation of these carbohydrates with other reactants, e.g. bromine water, produce samples having the —COOH groups at the $C_6$ position.

Products of this kind have many interesting possibilities and may be employed for example in preventing scale formation or as soil suspending agents in a manner similar to the use of carboxymethyl cellulose. In addition, the oxidized product can be useful in the tanning of leather, alone or in conjunction with other tanning agents. The gel properties of the oxidized material render it useful as an instant gel-forming agent in foods.

The invention will be better understood by reference to the following illustrative examples.

*Example 1*

10 parts of the galactose copolymer arabogalactan comprising 1 part arabinose and 6 parts galactose is dispersed in 100 parts of water containing 5.6 parts of $Na_2HPO_4$ and 5.5 parts of $NaH_2PO_4$. To the above mixture was added 3 parts of the enzyme galactose oxidase equivalent to 50 units of enzyme activity. At the end of 22 hours, the oxidation reaction was stopped by the addition of alcohol, washed and filtered. The material had a carbonyl content of 1.5%. As such it is useful in typical reactions of carbonyl compounds, for example, that described in Example 12.

*Example 2*

550 parts of the galactose copolymer guar consisting of a ratio 2 parts of mannose to 1 part of galactose was dispersed in 4000 parts of water containing 22 parts of sodium phosphate monobasic and 41 parts of disodium phosphate. To the above mixture was added 34 parts of the enzyme galactose oxidase equivalent to 1700 units and 1.7 parts of the enzyme peroxidase. The reaction is stirred while exposed to the atmosphere for 72 hours. The reaction was stopped by the addition of alcohol at the end of this period, then washed and filtered. The material had a carbonyl content of 1.5% as analyzed by the formation of oxime when hydroxylamine hydrochloride was reacted with the oxidized product.

*Example 3*

220 parts of guar is dispersed in 1800 parts of water containing 10.7 parts of disodium phosphate and 5.5 parts of monosodium phosphate. To the above mixture was added 14 parts of galactose oxidase equivalent to 700 units. The ingredients were mixed, topped with a small amount, i.e. in the order of monomolecular layer, of toluene and stirred gently for 48 hours. At the end of this period, the sample was precipitated out of solution, washed with water, and freeze dried. This material had a carbonyl content of 1% and enters into the typical carbonyl reactions.

*Example 4*

1 part of guar dispersed in 150 parts of water containing 1 part of disodium phosphate and 0.6 part of monosodium phosphate. To this mixture was added 3 parts of enzyme galactose oxidase equivalent to 90 units. The reaction was allowed to proceed in the presence of atmospheric $O_2$. At the end of 24 hours, the reaction was stopped by addition of ethyl alcohol, the precipitate was washed and filtered and analyzed for carbonyl content. The sample had a carbonyl content of 4.6%.

*Example 5*

The procedure of Example 4 is repeated except that no phosphates are added. The sample had a carbonyl content of 0.6%.

*Example 6*

200 parts of gum arabic was dispersed in 2000 parts of water. To the sample was added 3 parts of galactose oxidase—90 units and 0.15 part of catalase. At the end of 24 hours, the reaction product was dialyzed against water and then freeze dried. The product gave a positive test for carbonyls.

*Example 7*

200 parts of locust bean gum are dispersed in 6000 parts of water. To this dispersion is added 7 parts of galactose oxidase—210 units and 1.5 parts of catalase. At the end of 48 hours the reaction product was dialyzed against water and freeze dried. A positive test for carbonyls was obtained.

*Example 8*

5 parts of carboxymethyl cellulose are dispersed in 95 parts of water. To this was added 1.25 parts of aldehyde guar, carbonyl content 1.75%, obtained by oxidizing guar at the $C_6$ position of the galactose unit, dispersed in a solution of sodium bisulfite. To the resulting solution of carboxymethyl cellulose and aldehyde guar was added 2.75 parts of glycerine. Then, 20 parts of tobacco dust, which passed an 80-mesh U.S. standard sieve, were introduced into the solution. This slurry was applied on a stainless steel film-forming surface which was then dried to produce a tobacco sheet characterized by having a substantial increase in both wet and dry tensile properties over a sample in which the aldehyde guar is omitted.

*Example 9*

5 parts of sodium carboxymethyl cellulose were dispersed in 145 parts of water. To this solution were added 50 parts of a 5% solution of completely oxidized arabogalactan in water. The composite solution was mixed into the solution to act as a cross-linking agent. This material was applied upon a stainless steel surface and dried to form a self-sustaining tough water-resistant flexible film.

*Example 10*

2½ parts of guar gum was dispersed in 145 parts of water. To this solution was added 4 parts of 10% solution of oxidized locust bean gum (3% carbonyl content) in water and the composite solution was mixed. The mixture was applied to a stainless steel surface and dried into a self-sustaining water-resistant film.

*Example 11*

10 parts by weight of polyvinyl alcohol (obtained as Elvanol 72–60 from E. I. du Pont) was dissolved in 90 parts of water by heating to 85° C. for 40 minutes with continuous agitation. One part by weight of guar in which 50% of the carbon 6 alcohol groups of galactose were converted to aldehyde groups by oxidation was added to the polyvinyl alcohol solution. The solution was stirred and cast into a film by depositing the solution to a stainless steel plate. A water-resistant, self-sustaining film was obtained.

*Example 12*

To 150 parts of 2% pulp suspension CSF (+600) there was added 7.5 parts of 1.0% oxidized Stractan (as prepared in Example 1) which is dispersed in 0.3% of aqueous sodium bisulfite. The pH of the mixture was adjusted to 3.5 with HCl. Three minutes after the addition of 1 part of 30% hydrogen peroxide to the suspension, hand sheets were formed according to standard TAPPI methods. The sample when tested for dry and wet strengths had a 25% increase in dry and wet strength over control samples containing no oxidized Stractan (arabogalactan).

*Example 13*

Sheets prepared according to the method outlined above in Example 12 are prepared except that in place of oxidized Stractan, oxidized gum arabic prepared similarly as described in Example 6, having a carbonyl content of 1% was used. The sample when tested according to TAPPI standard methods of testing hand sheets had a 35% increase in dry and wet tensile strength over control samples.

*Example 14*

The procedure of Example 12 is repeated except that oxidized locust bean gum having 2% carbonyl content was used as the wet strength or cross-linking agent. The sheets had 40% increase in dry tensile strength and 100% increase in wet tensile strength over the control sample.

*Example 15*

The example which employs the procedure of Example 12 uses oxidized guar (0.7% carbonyl content). The sheets had 20% increase in dry tensile strength and 125% increase wet tensile strength over the control sample.

*Example 16*

1 part of oxidized guar having a carbonyl content of 1.5% was dispersed in 50 parts of 4% bromine water and shaken gently for 19 hours at room temperature. The material was washed with methanol, dried and analyzed. Both carboxyl and carbonyl groups are present at the $C_6$ position. The sample when analyzed by infrared spectroscopy had typical spectrum for a sample containing carboxyl groups whereas the control sample of untreated oxidized guar evidenced no infrared absorption characteristic of carboxyl content.

*Example 17*

A 4.19% solid slurry containing pulp, diatomaceous earth, propyleneglycol, guar and captan in the relative ratio of 1:0.7:0.75:1.0:104 respectively. 4 parts of this slurry was mixed with 0.5 part of 1.5% oxidized guar (carbonyl content 1.0%) dispersed in 0.6% sodium bisulfite. To this mixture was added 5 parts of comminuted tobacco and 2 parts of 30% hydrogen peroxide. The tobacco dust used in this example has been dry ground to pass a screen having an opening of about 0.25 millimeters. The slurry is conveniently formed into a sheet on a flat stainless steel belt and dried at about 100° C. by impingement of steam on the undersurface of the steel belt. The sheet when tested had substantial increase in wet and dry tensile strength over the control sample in which the oxidized guar is omitted.

*Example 18*

To 200 parts of continuously stirred pulp suspension CSF +600 (0.375% consistency) 4 parts of 2% cato starch were added to the pulp with no pH adjustments. After a minimum of 2 minutes contact time, 20 parts of 1% terminal aldehyde guar suspension in 0.3% sodium sulfite were added. pH of the system is 4.5. The sample when tested for wet strength properties has a 55% increase over the control sample.

*Example 19*

10 parts of oxidized guar prepared as taught by the invention and containing 5% carbonyl was dispresed in 100 parts of 0.4% methanolic HCl at room temperature for 2 days. At the end of this period the product was filtered, washed free of the methanol and analyzed for methoxyl content. The sample had a methoxyl content of 1.65%.

*Example 20*

2 parts of oxidized guar as taught by the invention was dispersed in 5 parts of hydroxylamine hydrocholoride which had been dissolved in 50 parts of 2% NaOH solution. The mixture was heated in a steam bath for 30 minutes, cooled in an ice bath, precipitated with methanol, washed five times with aqueous methanol and dried. The sample when analyzed had a nitrogen content of 0.81%.

*Example 21*

2 parts of oxidized locust bean gum was dispersed in 100 parts of methanol containing 20 parts of hexamethyldiamine. The mixture is heated for 5 hours at 50° C., cooled to room temperature, and washed with methanol, filtered and washed again. The sample when analyzed had a nitrogen content of 2.0%.

*Example 22*

10 parts of casein was dispersed in 50 parts of water at pH 7.0. To this solution was added 1 part of oxidized guar previously dispersed in 75 parts of water containing small amounts (about 0.5%) of sodium bisulfite. The material was allowed to react for 2 hours at room temperature. The product (casein oxidized guar complex) was isolated from the solution by adjusting pH to 3.7, filtered, washed free of acid with water and dried in vacuo at 80° C. The light colored complexed sample had a nitrogen analysis of 5.4%. The cross-linked casein is insoluble in dilute alkali and acid and thus has potential value as a water resistant coating for paper.

Various additional modifications may be made in the teaching presented without departing from the scope of the inventive concept. Accordingly, the invention is not to be limited except insofar as necessitated by the appended claims.

I claim:
1. The reaction product of (A) a carbohydrate having a galactose configuration at the $C_4$ position and oxidized to form a carbonyl group at the $C_6$ position and (B) a carbonyl reactive compound.
2. The reaction product of (A) a carbohydrate having a galactose configuration at the $C_4$ position and oxidized to form a carbonyl group at the $C_6$ position and (B) a compound selected from the group consisting of carbohydrates, proteins, polyhydroxy polymers, polyamino polymers, tobacco and paper.
3. The reaction product of claim 1 wherein (A) is a galactose containing polymer.
4. The reaction product of (A) a carbohydrate having a galactose configuration at the $C_4$ position and oxidized to form a carbonyl group at the $C_6$ position and (B) polyvinyl alcohol.
5. The reaction product of (A) a carbohydrate having a galactose configuration at the $C_4$ position and oxidized to form a carbonyl group at the $C_6$ position and (B) cellulose.
6. The reaction product of (A) a carbohydrate having a galactose configuration at the $C_4$ position and oxidized to form a carbonyl group at the $C_6$ position and (B) tobacco.
7. The reaction product of (A) a carbohydrate having a galactose configuration at the $C_4$ position and oxidized to form a carbonyl group at the $C_6$ position and (B) periodic acid.
8. The reaction product of (A) a carbohydrate having a galactose configuration at the $C_4$ position and oxidized to form a carbonyl group at the $C_6$ position and further oxidized to provide a carboxyl group at the $C_6$ position.
9. The reaction product of claim 1 wherein the carbohydrate (A) is oxidized in the presence of galactose oxidase.
10. The oxidation reaction product of (A) a carbohydrate having the galactose configuration at the $C_4$ position in the presence of (B) the enzyme galactose oxidase.
11. The oxidation reaction product of (A) a compound consisting essentially of a galactose copolymer, wherein said galactose comprises not more than about 90 percent by weight of the copolymer in the presence of (B) the enzyme galactose oxidase.
12. The product of claim 1 wherein (A) is galactomannan.
13. The product of claim 1 wherein (A) is arabogalactan.
14. The product of claim 1 wherein (A) is gum arabic.

15. The method of making carbonyl reactive carbohydrates characterized by having the galactose configuration at the $C_4$ position which comprises dissolving said carbohydrate in an aqueous solution at a pH between about 4.5 and 7.5, reacting said solution in the presence of oxygen with the aid of the enzyme galactose oxidase, and separating the reaction product.

References Cited by the Examiner
UNITED STATES PATENTS
3,042,668  7/1962  Monti et al. _____ 260—209

WILLIAM H. SHORT, *Primary Examiner.*
J. NORRIS, *Assistant Examiner.*